US011673578B2

(12) United States Patent
Sarkar et al.

(10) Patent No.: US 11,673,578 B2
(45) Date of Patent: Jun. 13, 2023

(54) METHOD AND SYSTEM FOR SAFE HANDLING OF AN AUTONOMOUS VEHICLE DURING EMERGENCY FAILURE SITUATION

(71) Applicant: Wipro Limited, Bangalore (IN)

(72) Inventors: Arnik Sarkar, Murshidabad (IN); Pranab Ghosh, Kolkata (IN); Dipanjan Choudhury, Kolkata (IN)

(73) Assignee: Wipro Limited, Bangalore (IN)

( * ) Notice: Subject to any disclaimer, the term of this patent is extended or adjusted under 35 U.S.C. 154(b) by 102 days.

(21) Appl. No.: 16/930,474

(22) Filed: Jul. 16, 2020

(65) Prior Publication Data

US 2021/0300417 A1 Sep. 30, 2021

(30) Foreign Application Priority Data

Mar. 31, 2020 (IN) .............................. 202041014301

(51) Int. Cl.
*B60W 60/00* (2020.01)
*G05D 1/00* (2006.01)
*G05D 1/02* (2020.01)
*B60W 50/02* (2012.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC ............. B60W 60/0015; B60W 30/09; B60W 30/0956; B60W 50/0205; B60W 2420/42;
(Continued)

(56) References Cited

U.S. PATENT DOCUMENTS 8,457,827 B1 6/2013 Ferguson et al.
9,342,074 B2 5/2016 Dolgov et al.
(Continued)

FOREIGN PATENT DOCUMENTS

DE 112017003968 T5 5/2019
KR 20160139594 A * 12/2016 ............ B60W 50/04
(Continued)

*Primary Examiner* — Russell Frejd
*Assistant Examiner* — Ana D Thomas
(74) *Attorney, Agent, or Firm* — Finnegan, Henderson, Farabow, Garrett & Dunner, LLP

(57) ABSTRACT

A method and road assistance system for safe handling an autonomous vehicle during emergency failure situation is disclosed. The road assistance system establishes a network connection with autonomous vehicle, where request for the network connection is transmitted by the autonomous vehicle on detection of operation failures. Upon establishing the network connection with the autonomous vehicle, vehicle failure information is received from the autonomous vehicle. The road assistance system determines type of failure in the autonomous vehicle based on the vehicle failure information. Further, current surrounding environment information is obtained for the autonomous vehicle from one of autonomous vehicle and one or more sensing devices located in proximity to the autonomous vehicle. Thereafter, the road assistance system generates at least one control instruction based on the type of failure and the current surrounding environment information. The at least one control instruction is provided to the autonomous vehicle for execution during the emergency failure situation.

17 Claims, 7 Drawing Sheets

(51) Int. Cl.
*B60W 30/095* (2012.01)
*B60W 30/09* (2012.01)

(52) U.S. Cl.
CPC ....... *B60W 50/0205* (2013.01); *G05D 1/0055* (2013.01); *G05D 1/0214* (2013.01); *B60W 2420/42* (2013.01); *B60W 2554/80* (2020.02); *B60W 2555/00* (2020.02); *B60W 2556/45* (2020.02); *G05D 2201/0213* (2013.01)

(58) Field of Classification Search
CPC ......... B60W 2554/80; B60W 2555/00; B60W 2556/45; B60W 2050/0094; G05D 1/0055; G05D 1/0214; G05D 1/0011; G05D 2201/0213
See application file for complete search history.

(56) References Cited

U.S. PATENT DOCUMENTS

| | | | |
|---|---|---|---|
| 10,248,116 | B2 | 4/2019 | Okumura et al. |
| 2018/0136653 | A1* | 5/2018 | Tao .......................... G07C 5/00 |
| 2019/0051188 | A1* | 2/2019 | Moustafa ............. G05D 1/0291 |
| 2019/0129416 | A1 | 5/2019 | Upmanue et al. |
| 2020/0201323 | A1* | 6/2020 | Park ...................... B60W 50/04 |
| 2022/0219699 | A1* | 7/2022 | Nara .................. G01C 21/3647 |

FOREIGN PATENT DOCUMENTS

| | | | |
|---|---|---|---|
| KR | 101927311 B1 | 12/2018 | |
| KR | 20190051188 A * | 5/2019 | ............. A23K 10/30 |
| WO | 2019074288 A1 | 4/2019 | |

\* cited by examiner

METHOD AND SYSTEM FOR SAFE HANDLING OF AN AUTONOMOUS VEHICLE DURING EMERGENCY FAILURE SITUATION

TECHNICAL FIELD

The present subject matter is related in general to autonomous vehicle assistance system, more particularly, but not exclusively to method and system for safe handling an autonomous vehicle during emergency failure situation.

BACKGROUND

With introduction of autonomous vehicles and progressive growth in autonomous technology, there is a paradigm shift happening in automotive industry. While most of vehicle manufacturer are focusing heavily in bringing new features and technologies in the autonomous vehicle, ensuring safety in autonomous driving is becoming a key focus among all.

There are several scenarios where safety of the autonomous vehicles can be compromised. For example, generally an autonomous vehicle understands external driving environments through associated sensors, actuators and camera data. However, the data from the sensors and the actuators are not always correct and there are possibilities of random hardware failure, which could lead up to safety issues. Similarly, the autonomous vehicles use artificial intelligence to perceive driving environment. However, the artificial intelligence does not deliver its best result in chaotic conditions such as, high traffic in road or in crowded street, which leads to delay in decision-making and finally ends up with untoward events, for example accidents. Further, the autonomous driving needs infrastructure supports such as, lane marking. If lanes are not clearly marked on roads, lane sensing functionality of the autonomous vehicles may fail which would lead up to safety issues.

Thus, in such situations, the autonomous vehicle usually handles safety critical scenarios by performing a smooth handover of control either to a driver or to a remote operator of the vehicle and moves to manual driving mode from the autonomous driving mode. However, if the driver or the remote operator fails to take the control, there is no fallback safety mechanism in current system which could take the vehicle to a fail-safe state and prevent accidents.

Current systems provide mechanism to switch from autonomous mode to manual mode when the autonomous driving of the autonomous vehicle has been compromised. In addition, the current systems send alerts to external environment of the vehicle when switching to manual mode has been failed. However, these systems depend upon the external environment to take appropriate safety measures and does not provide any fallback safety mechanisms in case the external environment fails to take necessary safety measures.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for safe handling an autonomous vehicle during emergency failure situation. The method comprises establishing a network connection with an autonomous vehicle, where a request for the network connection is transmitted by the autonomous vehicle on detection of one or more operation failures. Upon establishing the network connection with the autonomous vehicle, vehicle failure information is received from the autonomous vehicle. Further, the method includes determining a type of failure in the autonomous vehicle based on the vehicle failure information. Current surrounding environment information is obtained for the autonomous vehicle from one of the autonomous vehicle and one or more sensing devices located in proximity to the autonomous vehicle. Thereafter, the method includes generating at least one control instruction based on the type of failure and the current surrounding environment information. The at least one control instruction is provided to the autonomous vehicle for execution during the emergency failure situation.

In an embodiment, the present disclosure may relate to a road assistance system for safe handling an autonomous vehicle during emergency failure situation. The road assistance system may comprise a processor and a memory communicatively coupled to the processor, where the memory stores processor executable instructions, which, on execution, may cause the road assistance system to establish a network connection with an autonomous vehicle, where a request for the network connection is transmitted by the autonomous vehicle on detection of one or more operation failures. Upon establishing the network connection with the autonomous vehicle, vehicle failure information is received from the autonomous vehicle. The road assistance system determines a type of failure in the autonomous vehicle based on the vehicle failure information. Further, current surrounding environment information is obtained for the autonomous vehicle from one of the autonomous vehicle and one or more sensing devices located in proximity to the autonomous vehicle. Thereafter, the road assistance system generates at least one control instruction based on the type of failure and the current surrounding environment information. The at least one control instruction is provided to the autonomous vehicle for execution during the emergency failure situation.

In an embodiment, the present disclosure relates to a non-transitory computer readable medium including instructions stored thereon that when processed by at least one processor may cause a road assistance system to establish a network connection with an autonomous vehicle, where a request for the network connection is transmitted by the autonomous vehicle on detection of one or more operation failures. Upon establishing the network connection with the autonomous vehicle, vehicle failure information is received from the autonomous vehicle. The instruction causes the processor to determine a type of failure in the autonomous vehicle based on the vehicle failure information. Further, current surrounding environment information is obtained for the autonomous vehicle from one of the autonomous vehicle and one or more sensing devices located in proximity to the autonomous vehicle. Thereafter, the instruction causes the processor to generate at least one control instruction based on the type of failure and the current surrounding environment information. The at least one control instruction is provided to the autonomous vehicle for execution during the emergency failure situation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
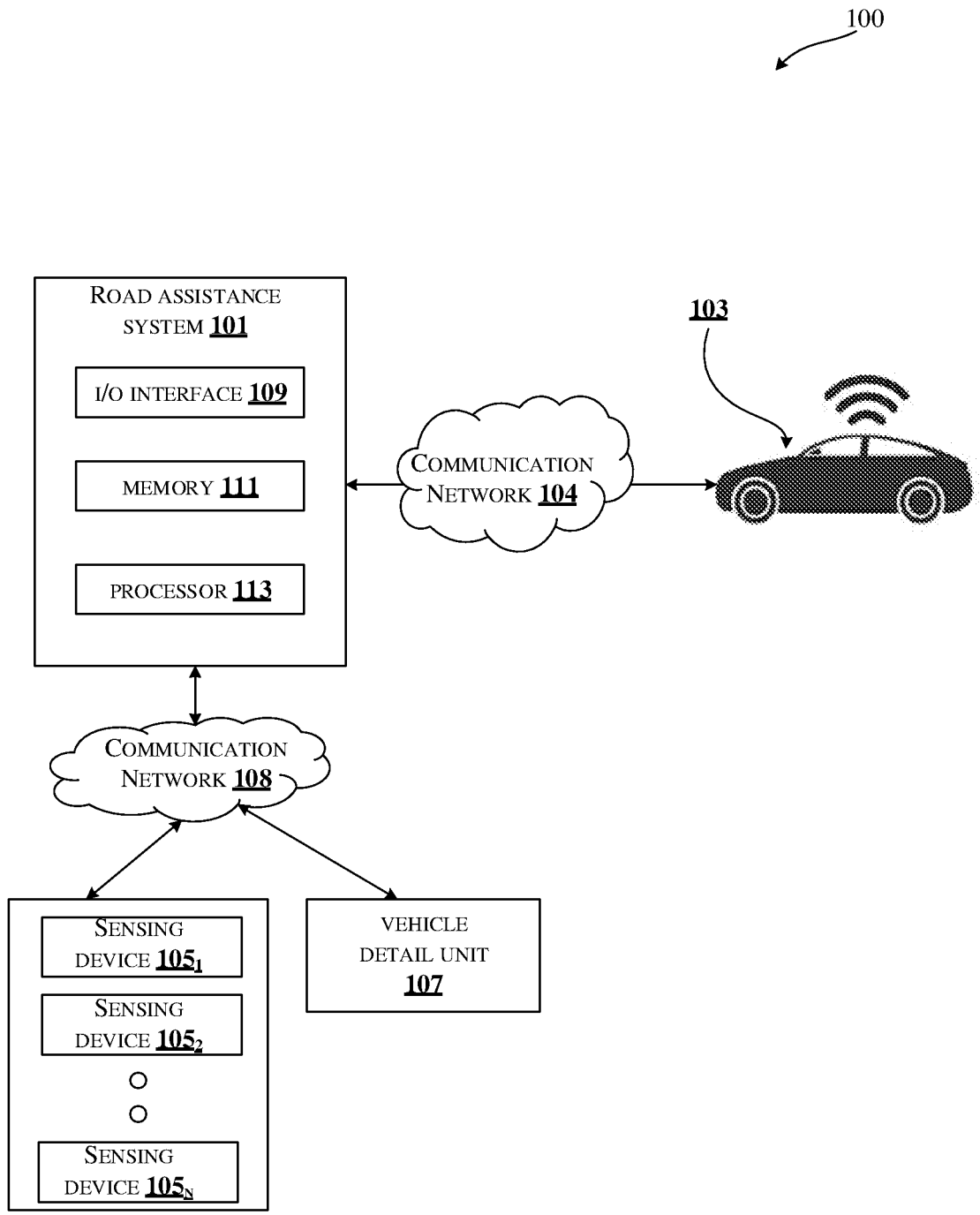
FIG. 1 illustrates an exemplary environment for safe handling an autonomous vehicle during emergency failure situation in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and road assistance system for safe handling of an autonomous vehicle during emergency failure situation. In an embodiment, the emergency failure situation may refer to failure of one or more components such as, sensors, actuators and the like of the autonomous vehicle. Currently, systems provide mechanism to switch from autonomous mode to manual mode when autonomous driving of the autonomous vehicle has been compromised due to one or more failures. In addition, current systems send alerts to external environment of the autonomous vehicle, when switching to manual mode has been failed. However, these systems depend upon the external environment to take appropriate safety measures and does not provide any fallback safety mechanisms in case the external environment fails to take necessary safety measures.

The present disclosure resolves this problem by using a safety fallback mechanism through which the autonomous vehicle can perceive the external environment and take one or more actions when the switching from autonomous driving to manual driving fails. The present disclosure enables the autonomous vehicle to establish a network connection with the road assistance system on detection of one or more operation failures. Upon establishing the network connection, a type of failure in the autonomous vehicle is determined based on vehicle failure information received from the autonomous vehicle. Further, current surrounding environment information of the autonomous vehicle is obtained either from the autonomous vehicle or one or more sensing devices located in proximity to the autonomous vehicle. The current surrounding environment information is utilised to generate control instruction based on the type of failure. The control instruction is provided to the autonomous vehicle for execution during the emergency failure situation. Thus, the claimed invention facilitates the autonomous vehicle with the safety fallback mechanism to either park safely on roadside and/or move safely when the switch from autonomous mode to manual model fails.

FIG. 1 illustrates an exemplary environment for safe handling an autonomous vehicle during emergency failure situation in accordance with some embodiments of the present disclosure.

As shown in FIG. 1, an environment 100 includes a road assistance system 101 connected to an autonomous vehicle 103 through a communication network 104 such as, a Vehicle to Anything (V2X) wireless communication or any other standard mechanisms of communication. In an embodiment, the road assistance system 101 may be connected to a plurality of autonomous vehicles present in proximity to the road assistance system 101. Further, the road assistance system 101 is connected to a sensing device $105_1$, a sensing device $105_2$, . . . and a sensing device $105_N$ (collectively referred as plurality of sensing devices 105) and a vehicle detail unit 107 through a communication network 108. In an embodiment, the communication network 108 may include a wireless communication. In an embodiment, the road assistance system 101 may be located at one or more regions of driving. The plurality of sensing devices 105 may be situated adjacent to roads at specific distance and may collect surrounding environment data using one or more modules.

The one or more modules of the plurality of sensing devices 105 may include a Global Positioning System (GPS), an Inertial Measurement Unit (IMU), a Radio Detection and Ranging (RADAR), a Light Detection and Ranging (LIDAR), a camera, and an actuator. A person skilled in the art would understand that the any other type of sensing unit, not mentioned explicitly herein, may also be include in each of the plurality of sensing devices 105. The vehicle detail unit 107 may include registered list of autonomous vehicles for different regions. The road assistance system 101 may provide safe handling for the autonomous vehicle 103 during any emergency failure situation. Further, the road assistance system 101 may include an I/O interface 109, a memory 111 and a processor 113. The I/O interface 109 may be configured to receive data from the autonomous vehicle 103, the plurality of sensing devices 105 and the vehicle detail unit 107. The data from the I/O interface 109 may be stored in the memory 111. The memory 111 may be communicatively coupled to the processor 113 of the road assistance system 101. The memory 111 may also store processor instructions which may cause the processor 113 to execute the instructions for safe handling of the autonomous vehicle 103 during the emergency failure situation.

The road assistance system 101 may include, but not limited to, a dedicated handheld device, a tablet, a server and any other computing devices. A person skilled in the art would understand that, any other devices, not mentioned explicitly, may also be used as the road assistance system 101 in the present disclosure. In an embodiment, the road assistance system 101 may exchange data with other components or service provider using a wide area network/Internet (not shown explicitly in FIG. 1).

While driving through a region, the autonomous vehicle 103 may detect one or more operation failure, such as, failure while switching from autonomous to manual driving, failure in perceiving the surrounding environment, decision making issues while driving and the like. In such condition, the autonomous vehicle 103 may connect with the road assistance system 101 located in the region. The road assistance system 101 may receive a network connection request from the autonomous vehicle 103. The road assistance system 101 may establish the network connection with the autonomous vehicle 103 by authenticating the autonomous vehicle 103 using vehicle information received in the request. On a successful authentication, the road assistance system 101 may enable a communication with the autonomous vehicle 103. Alternatively, if the authentication fails, the road assistance system 101 may initiate a new registration process for the autonomous vehicle 103 for enabling the communication. The authentication of the autonomous vehicle 103 is explained in detail in FIG. 2. Further, once the network connection is established with the autonomous vehicle 103, the road assistance system 101 may receive vehicle failure information from the autonomous vehicle 103. The vehicle failure information may include an error status message for one or more units of the autonomous vehicle 103, details of diagnostic error code set due to the failure of one or more corresponding hardware unit, location information, a speed and a direction related to movement information and the like.

The road assistance system 101 processes the vehicle failure information and determines a type of failure in the autonomous vehicle 103. The type of failure may include failure in at least one unit of the autonomous vehicle 103, system failure and driver assistance request. The request from the autonomous vehicle 103 may be categorised into Environment Perception Error (EPE), where the autonomous vehicle 103 is unable to perceive the surrounding environment and unable to move safely, a Decision Making Error (DME) when one or more hardware units fails and Driving Control Error (DCE) when a driver/operator of the autonomous vehicle 103 fails to accept switch from autonomous mode to the manual mode.

Further, the road assistance system 101 may obtain current surrounding environment information for the autonomous vehicle 103. Depending on the type of failure, the road assistance system 101 may obtain the current surrounding environment information either from the autonomous vehicle 103 or from one or more sensing devices of the plurality of sensing devices 105 located in proximity to the autonomous vehicle 103. For instance, the road assistance system 101 may connect with the one or more sensing device when the failure is EPE type, due to which the autonomous vehicle 103 may not be able to perceive the surrounding environment.

Thereafter, the road assistance system 101 generates at least one control instruction based on the type of failure and the current surrounding environment information. The at least one control instruction may include Control Command with Environment perception data (CCEPD), in case the type of failure is EPE and Control command with Decision data (CCDD), if the type of failure is one of the DME or the DCE.

When the type of failure is EPE, the road assistance system 101 may obtain location details of the autonomous vehicle 103 and creates a predefined radius area, for example, 500-meter radius centralized to the location of the autonomous vehicle 103. Further, the road assistance system 101 may identify one or more sensing devices in proximity to the radius area and obtains surrounding environment information from each of the identified one or more sensing devices.

Thereafter, trajectory information for the autonomous vehicle 103 is identified for autonomous control based on the obtained surrounding environment information. The road assistance system 101 may start a timer based on speed of the autonomous vehicle 103 and may recursively perform these steps until the autonomous vehicle 103 reaches destination location.

When the type of failure is DME, the road assistance system 101 may obtain the surrounding environment information from the autonomous vehicle 103 and may determine the trajectory information for autonomous driving based on the obtained surrounding environment information. Likewise, when the type of failure is DCE, the road assistance system 101 may create the predefined radius area centralized to location of the autonomous vehicle 103 and identify the one or more sensing devices in proximity to the radius area. Further, the trajectory information is calculated based on sensing data received from the one or more sensing devices. The calculation of the trajectory information is explained in detail under FIG. 3. Thus, if the control instruction is CCEPD, the road assistance system 101 may provide trajectory information to the autonomous vehicle 103, such that the autonomous vehicle 103 generates control instruction for autonomous driving on reception of the trajectory information. Similarly, when the control instruction is CCDD, the road assistance system 101 may generate and send the control instruction based on the trajectory information to the autonomous vehicle 103 for autonomous driving.

Figure 2:
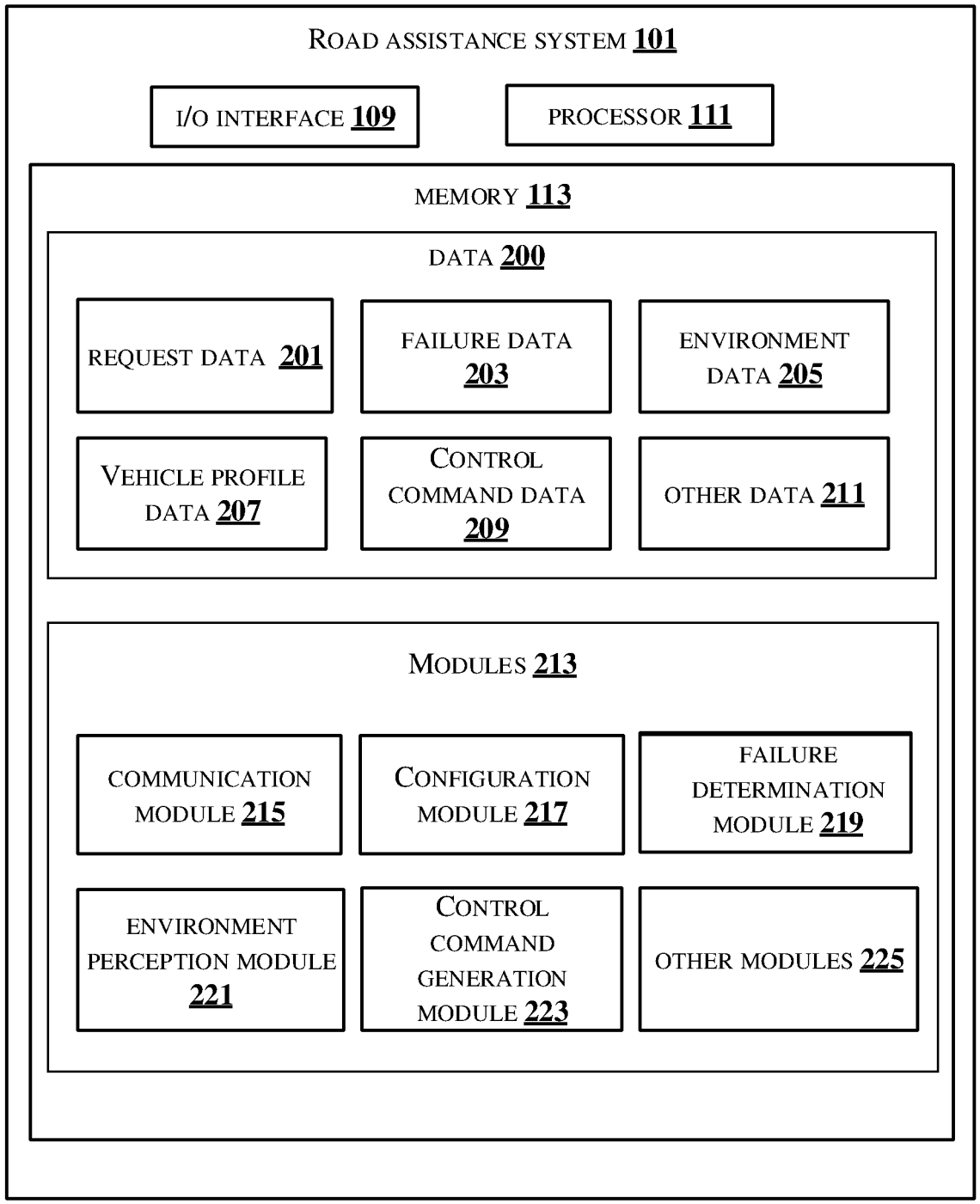
FIG. 2 shows a detailed block diagram of a road assistance system in accordance with some embodiments of the present disclosure.

FIG. 2 shows a detailed block diagram of a road assistance system in accordance with some embodiments of the present disclosure.

The road assistance system 101 may include data 200 and one or more modules 213 which are described herein in detail. In an embodiment, data 200 may be stored within the memory 111. The data 200 may include, for example, request data 201, failure data 203, environment data 205, vehicle profile data 207, control instruction data 209 and other data 211.

The request data 201 may include the request from the one or more autonomous vehicles for the network connection establishment. The request may include a vehicle identification number of the autonomous vehicle 103 from which the request is received.

The failure data 203 may include the vehicle failure information received from the autonomous vehicle 103. The vehicle failure information may include the error status message for one or more units of the autonomous vehicle 103, the details of diagnostic error code set due to the failure of one or more corresponding hardware unit, the location information, the speed and the direction related to movement information.

The environment data 205 may include surrounding environment information for the autonomous vehicle 103. The surrounding environment information may include for example, one or more objects such as, humans, other vehicles, or obstacles located in the environment.

The vehicle profile data 207 may include the list of registered autonomous vehicle 103. The vehicle profile data 207 may include the vehicle identification number for the registered autonomous vehicles.

The control instruction data 209 may include the Environment perception data (CCEPD) and the Control command with Decision data (CCDD).

The other data 211 may store data, including temporary data and temporary files, generated by modules 213 for performing the various functions of the road assistance system 101.

In an embodiment, the data 200 in the memory 111 are processed by the one or more modules 213 present within the memory 111 of the road assistance system 101. In an embodiment, the one or more modules 213 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 213 may be communicatively coupled to the processor 113 for performing one or more functions of the road assistance system 101. The said modules 213 when configured with the functionality defined in the present disclosure will result in a novel hardware.

In one implementation, the one or more modules 213 may include, but are not limited to a communication module 215, a configuration module 217, a failure determination module 219, an environment perception module 221 and a control instruction generation module 223. The one or more modules 213 may also include other modules 225 to perform various miscellaneous functionalities of the road assistance system 101. In an embodiment, the other modules 225 may include a vehicle location tracker module and an acquisition module. The vehicle location tracker module collects the location data from the autonomous vehicle 103. The acquisition module may obtain the surrounding environment information from each of the plurality of sensing devices 105 located in proximity of the autonomous vehicle 103 based on location information of the autonomous vehicle 103.

The communication module 215 may maintain communication with the autonomous vehicle 103. The communication module 215 may receive the request for the network connection from the autonomous vehicle 103. Further, the communication module 215 may receive the vehicle failure information from the autonomous vehicle 103 once the network connection is established with the road assistance system 101.

The configuration module 217 may be configured to establish the network connection with the autonomous vehicle 103. The configuration module 217 establishes the network connection by authenticating the autonomous vehicle 103. The configuration module 217 authenticates by checking the vehicle identification information received along with the request in the vehicle profile data 207. In case the vehicle identification information of the autonomous vehicle 103 is available in the vehicle profile data 207, the configuration module 217 indicate successful authentication. However, in case the vehicle identification information in not present in the vehicle profile data 207, the configuration module 217 may initiate a new registration process for the autonomous vehicle 103 by connecting with the vehicle detail unit 107 to obtain the vehicle details for the autonomous vehicle 103. On receiving the vehicle details, the configuration module 217 creates a new vehicle profile for the autonomous vehicle 103 with the details and creates a vehicle profile entry in the vehicle profile data 207 for the autonomous vehicle 103. Upon successful registration, the configuration module 217 may provide a registration acknowledgment to the autonomous vehicle 103.

Further, the configuration module 217 may also be configured to initialize the road assistance system 101 whenever the road assistance system 101 is switched ON. Once the road assistance system 101 is powered ON, the configuration module 217 may load a list of the plurality of sensing devices 105 which may be detected previously and sends a selective multicast discovery request. On receipt of the discovery request, each of the one or more sensing device of the plurality of sensing devices 105 may connect with the configuration module 217 and send respective location coordinates and any diagnostic trouble code (DTC) present with them. Thus, based on the network connection request, the configuration module 217 establishes network connection with each of the one or more sensing devices. Further, in case if the DTC is present for any of the one or more sensing devices, the configuration module 217 may send a restart command to such sensing device and may mark the sensing device as non-working. Further, the configuration module 217 may send a synchronization request to the vehicle detail unit 107 to provide the list of autonomous vehicles registered in the current region. Upon receiving the list, the configuration module 217 updates the list in the vehicle profile data 207 and sends a wake-up request to each of the modules of the road assistance system 101.

The failure determination module 219 may determine the type of failure in the autonomous vehicle 103 by processing the vehicle failure information received from the communication module 215. The vehicle failure information may include the error status message for the one or more units of the autonomous vehicle 103, the details of diagnostic error code set due to the failure of one or more corresponding hardware unit, the location information, the speed and the direction related to movement information. The failure determination module 219 may check the error status message and details of diagnostic error code and accordingly determine the failure in at least one unit of the autonomous vehicle 103, or system failure or the driver assistance request. Further, the failure determination module 219 detects the type of failure associated with autonomous vehicle 103 such as, the Environment Perception Error (EPE), the Decision-Making Error (DME) and the Driving Control Error (DCE).

The environment perception module 221 may obtain the current surrounding environment information for the autonomous vehicle 103. The environment perception module 221 may obtain the current surrounding environment information from either the autonomous vehicle 103 or from the acquisition module.

The control instruction generation module 223 may generate the at least one control instruction for the autonomous vehicle 103 based on the type of failure and the current surrounding environment information. The control instruction comprises the Control command with Environment perception data (CCEPD) in case the type of failure is EPE and the Control command with Decision data (CCDD), if the type of failure is one of the DME or the DCE. The control instruction generation module 223 provides trajectory information to the autonomous vehicle 103 in case of the CCEPD.

For instance, when the type of failure is EPE, the control instruction generation module 223 may obtain location details of the autonomous vehicle 103 from the vehicle location tracker module. The control instruction generation module 223 creates a predefined radius area, for example, 500-meter radius centralized to the location of the autonomous vehicle 103. Further, the control instruction generation module 223 may obtain the surrounding environment information from the acquisition module. Thereafter, the control instruction generation module 223 may identify the trajectory information for the autonomous vehicle 103 for autonomous control based on the obtained surrounding environment information. Further, the control instruction generation module 223 may start a timer based on the speed of the autonomous vehicle 103 and may recursively perform above steps until the autonomous vehicle 103 reaches destination location.

Further, when the type of failure is DME, the control instruction generation module 223 may obtain the surrounding environment information from the autonomous vehicle 103 and may determine the trajectory information using existing sensor fusion techniques for autonomous driving based on the obtained surrounding environment information. Likewise, when the type of failure is DCE, the control instruction generation module 223 may create the predefined radius area centralized to location of the autonomous vehicle 103. The control instruction generation module 223 obtains sensing data of the one or more sensing devices present in proximity to the radius area from the acquisition module and calculates the trajectory information based on the sensing data.

Figure 3A:
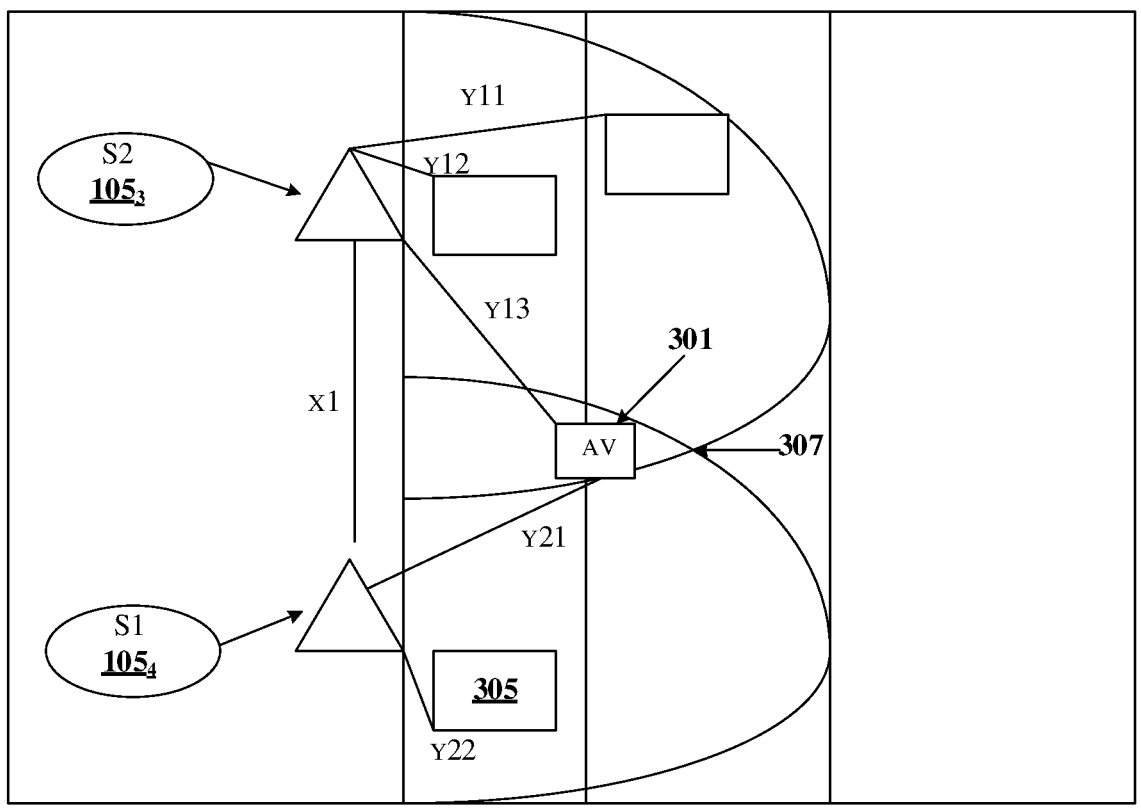
FIG. 3a shows an exemplary embodiment for determining vehicle trajectory in accordance with some embodiments of the present disclosure.

FIG. 3a shows an exemplary embodiment for determining vehicle trajectory in accordance with some embodiments of the present disclosure. FIG. 3a shows an autonomous vehicle (AV) 301 located in a region 303. The region includes two sensing devices S1 105$_3$ and S2 105$_4$ and an obstacle 305. In such situation, the control instruction generation module 223 may calculate a relative position of the AV 301 with respect to each of the one or more sensing devices, such as the S1 105$_3$ and S2 105$_4$. The control instruction generation module 223 determines a relative distance of the obstacle 305 from the AV 301. Further, the control instruction generation module 223 may determine a distance between one of the one or more sensing devices, such as the S1 105$_3$ and the AV 301 based on the calculated relative position using a predefined technique such as, a haversine technique. The control instruction generation module 223 obtains an image captured by the sensing device S1 105$_3$ and determines a first distance Y21 between the AV 301 and the sensing device S1 105$_3$ and a second distance Y22 between the obstacle 305 and the sensing device S1 105$_3$. The control instruction generation module 223 then matches the first distance Y21 and the second distance Y22 with the relative distance to identify the AV 301. The control instruction generation module 223 performs these operations for remaining one or more sensing devices, such as, S2 105$_4$, located in proximity to the AV 301. Thereafter, the control instruction generation module 223 combines the output from each of the one or more sensing devices to obtain the trajectory information of the AV 301.

Thus, the control instruction generation module 223 may provide trajectory information to the autonomous vehicle 103, such that the autonomous vehicle 103 generates the control instructions for autonomous driving on reception of the trajectory information. Similarly, the control instruction generation module 223 generates and sends the control instruction based on the trajectory information to the autonomous vehicle 103 for autonomous driving when the control instruction is CCDD.

Figure 4:
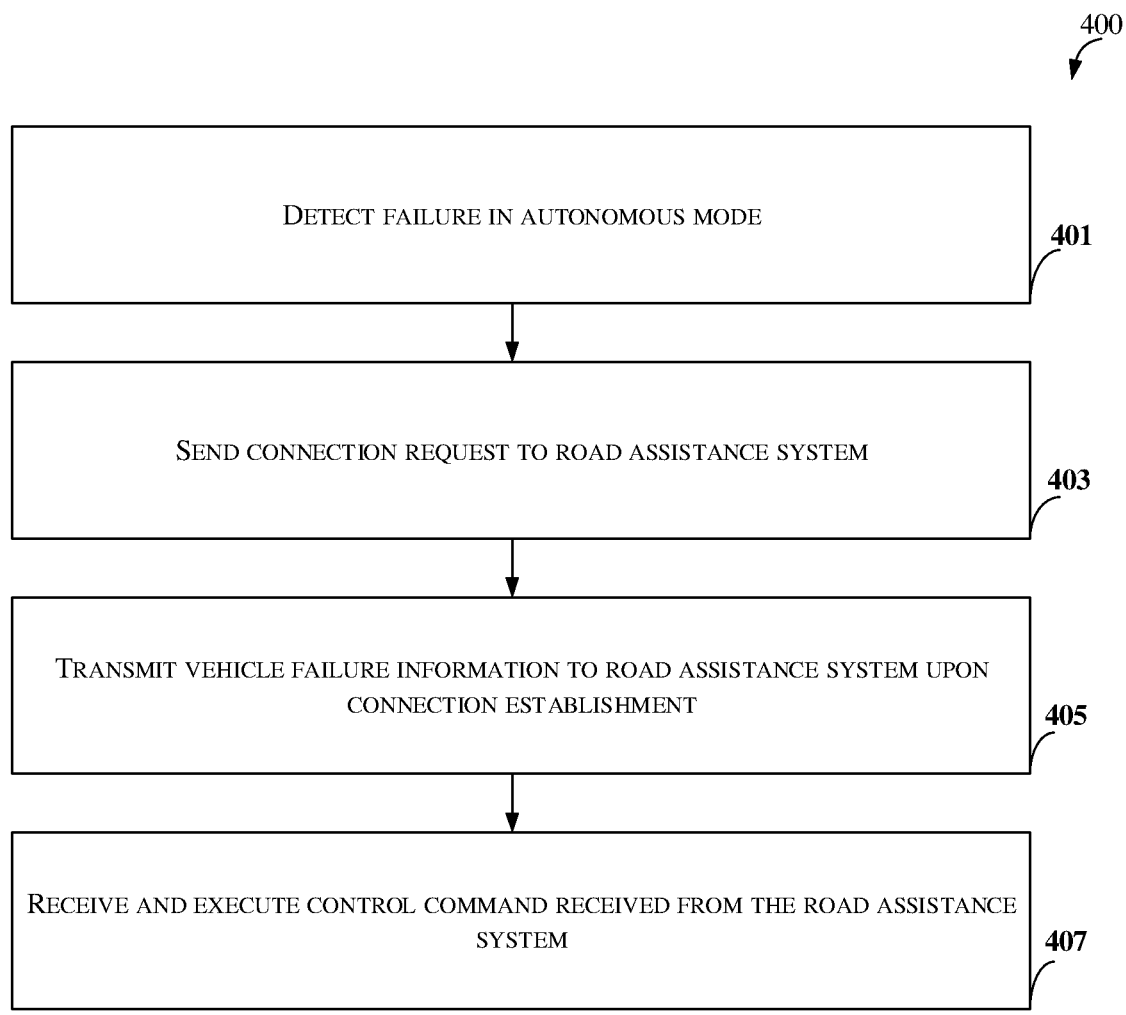
FIG. 4 illustrates a flowchart showing a method for safe handling during emergency failure situation by an autonomous vehicle in accordance with some embodiments of present disclosure.

FIG. 4 illustrates a flowchart showing a method for safe handling during emergency failure situation by an autonomous vehicle in accordance with some embodiments of present disclosure.

As illustrated in FIG. 4, the method 400 includes one or more blocks for safe handling during emergency failure situation by an autonomous vehicle 103. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401 the autonomous vehicle 103 may detect failure in autonomous mode of driving.

In an embodiment, each unit of the autonomous vehicle 103 may maintain an error status which may be set by one or more modules of the autonomous vehicle 103 to detect any failure. The one or more modules may include an Environment Identification Module (EIM), a Driver Decision Making Module (DDMM) and a Driving Control Module (DCM). The EIM module sets an EIM error-flag when it is unable to read any of attached sensors attached or on detecting an erroneous data from the sensors. The DDMM module may set a DDMM error-flag on detecting non-working state of any of submodules such as, sensor-fusion, computer vision, obstacle avoidance or navigation system. The DCM module may set a DCM error-flag on detecting on-working state of control instruction applied to any of sub-modules, such as steering, throttle, brake and the like.

At block 403, the autonomous vehicle 103 may send the network connection request to the road assistance system 101 on detecting the one or more operation failure.

At block 405, the autonomous vehicle 103 may transmit the vehicle failure information to the road assistance system 101 upon receiving the acknowledgment for the network connection request.

At block 407, the autonomous vehicle 103 may execute the control instructions received from the road assistance system 101.

Figure 5:
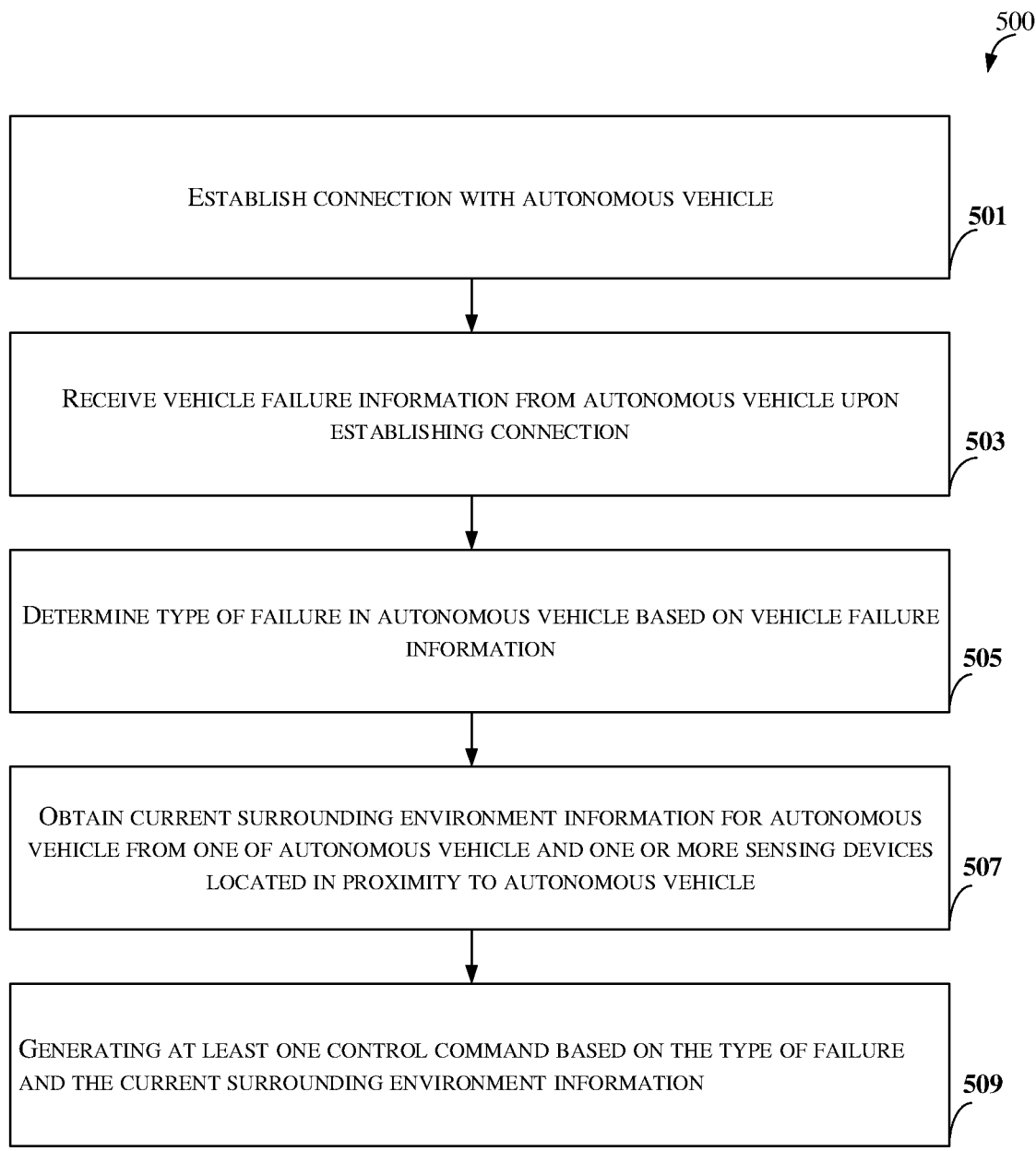
FIG. 5 illustrates a flowchart showing a method for safe handling an autonomous vehicle during emergency failure situation in accordance with some embodiments of present disclosure.

FIG. 5 illustrates a flowchart showing a method for safe handling an autonomous vehicle during emergency failure situation in accordance with some embodiments of present disclosure.

As illustrated in FIG. 5, the method 500 includes one or more blocks for safe handling an autonomous vehicle 103 during emergency failure situation. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the configuration module 217 may establish the network connection with the autonomous vehicle 103 upon receiving the request for the network connection from the autonomous vehicle 103.

Figure 3B:
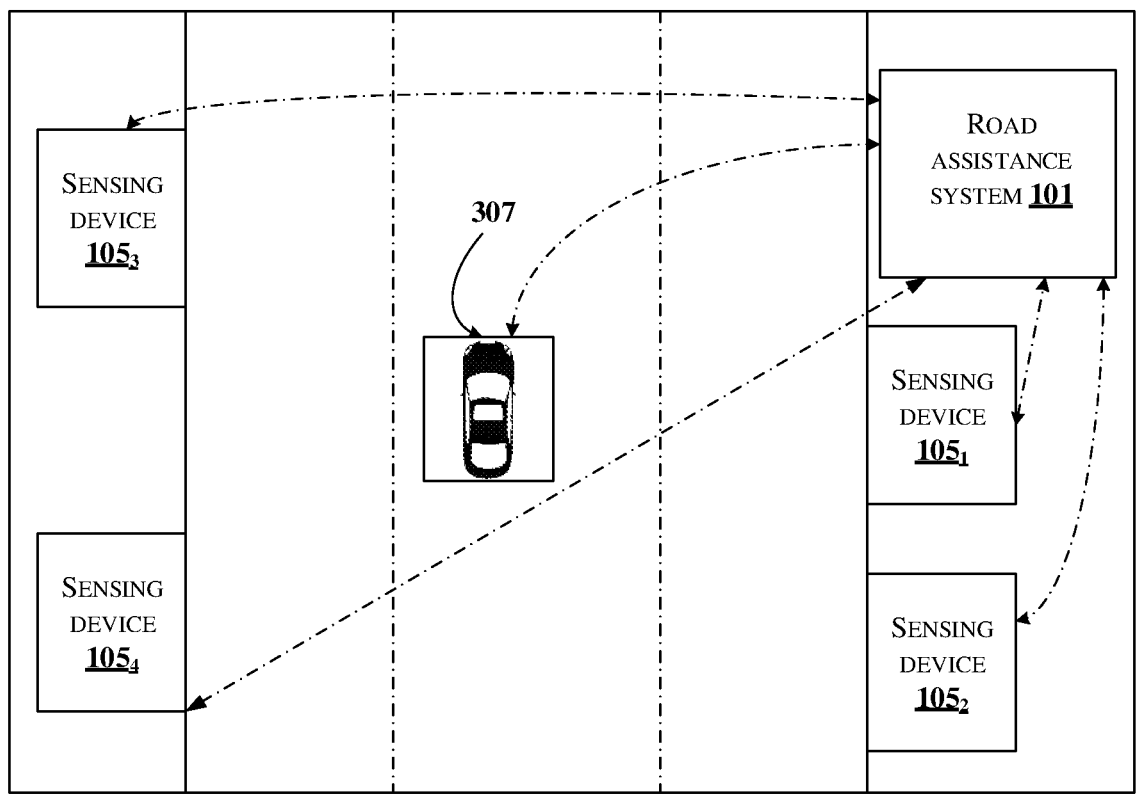
FIG. 3b shows an exemplary scenario for safe handling an autonomous vehicle during emergency failure situation in accordance with some embodiments of the present disclosure.

At block 503, the vehicle failure information is received by the communication module 215 from the autonomous vehicle 103. FIG. 3b shows an exemplary scenario for safe handling an autonomous vehicle 103 during emergency failure situation in accordance with some embodiments of the present disclosure. As shown in FIG. 3b, an autonomous vehicle, i.e. a car 307 is connected with the road assistance system 101.

At block 505, the type of failure in the autonomous vehicle 103 is determined by the failure determination module 219 based on the vehicle failure information.

At block 507, the current surrounding environment information is obtained by the environment perception module 221 for the autonomous vehicle 103 from one of the autonomous vehicle 103 and one or more sensing devices located in proximity to the autonomous vehicle 103.

At block 509, the least one control instruction is generated by the control instruction generation module 223 based on the type of failure and the current surrounding environment information. The at least one control instruction is provided to the autonomous vehicle 103 for execution during the emergency failure situation.

Figure 6:
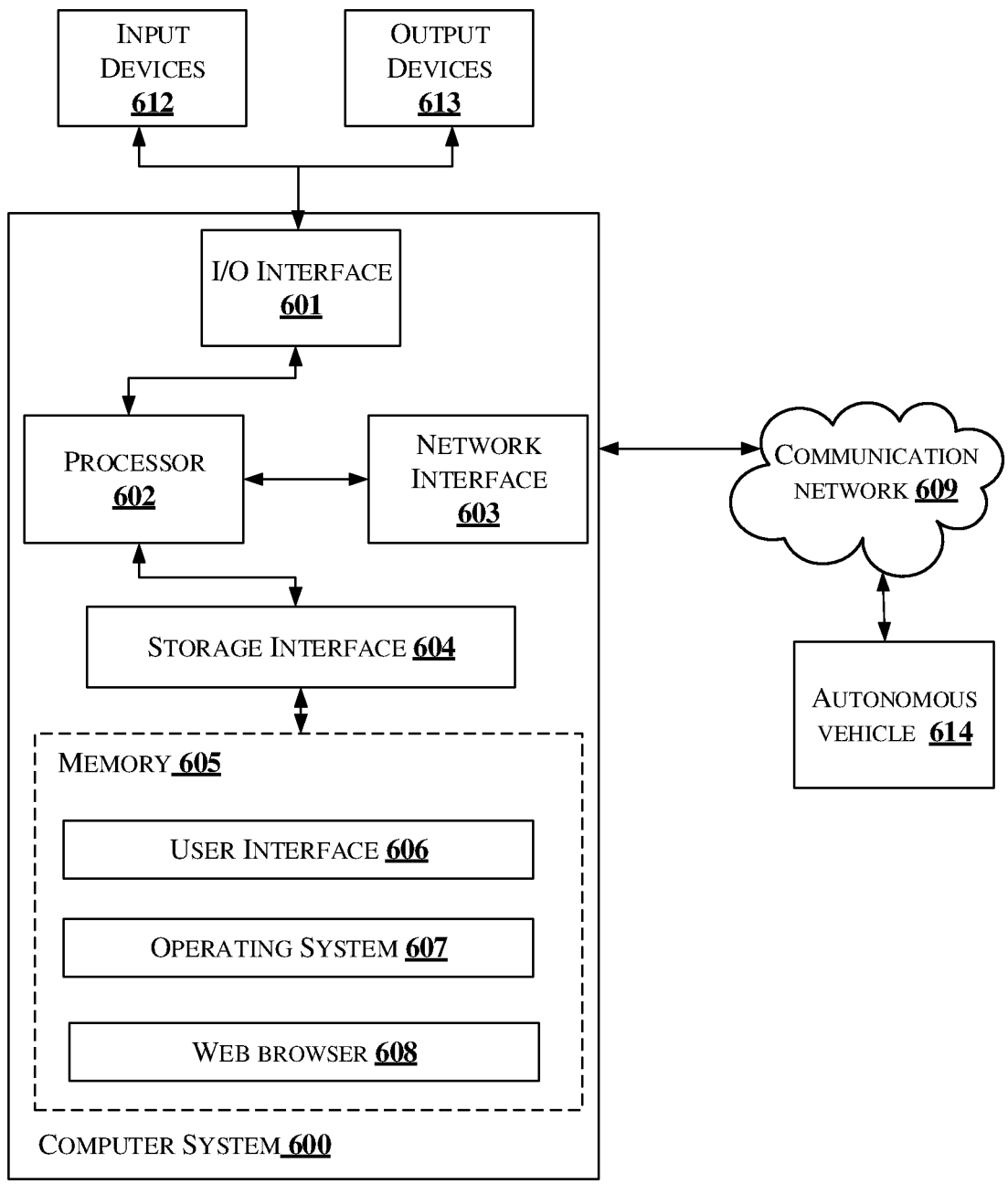
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the road assistance system 101. The computer system 600 may include a central processing unit ("CPU" or "processor") 602. The processor 602 may include at least one data processor for safe handling an autonomous vehicle 103 during emergency failure situation. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices such as input devices 612 and output devices 613. For example, the input devices 612 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 613 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 600 consists of the road assistance system 101. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with an autonomous vehicle 614. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such.

The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, NET™, CGI SCRIPTS™, JAVA™, JAVASCRIPT™, PERL™, PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides the autonomous vehicles with a safety mechanism to park safely on roadside and/or move safely when the driver fails to take control from the autonomous mode.

An embodiment of the present disclosure helps the autonomous vehicle when it fails to perceive the external surroundings and is unable to decide on its movements.

An embodiment of the present disclosure may help the autonomous vehicle when single/multiple module of the autonomous vehicle fails and is unable to decide on movements.

An embodiment of the present disclosure helps the autonomous vehicle when the driver fails to take control on any emergency request for the autonomous safe roadside parking and/or movements.

"In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem".

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral numerals: | |
| --- | --- |
| Reference Number | Description |
| 101 | Road assistance system |
| 103 | Autonomous vehicle |
| 104, 108 | Communication network |
| 105 | Plurality of sensing devices |
| 107 | Vehicle detail unit |
| 109 | I/O interface |
| 111 | Memory |
| 113 | Processor |
| 200 | Data |
| 201 | Request data |
| 203 | Failure data |
| 205 | Environment data |
| 207 | Vehicle profile data |
| 209 | Control instruction data |
| 211 | Other data |
| 213 | Modules |
| 215 | Communication module |
| 217 | Configuration module |
| 219 | Failure determination module |
| 221 | Environment perception module |
| 223 | Control instruction generation module |
| 225 | Other modules |
| 301 | AV |
| 303 | Region |
| 305 | Obstacles |
| 307 | Car |

What is claimed is:

1. A method of safe handling an autonomous vehicle during emergency failure situation, the method comprising:

establishing, by a road assistance system, a network connection with an autonomous vehicle, wherein a request for the network connection is transmitted by the autonomous vehicle on detection of one or more operation failures;

upon establishing the network connection with the autonomous vehicle, receiving, by the road assistance system, vehicle failure information from the autonomous vehicle;

determining, by the road assistance system, a type of failure to be at least one of an Environment Perception Error (EPE), wherein the autonomous vehicle is unable to perceive the surrounding environment, a Decision Making Error (DME), wherein one or more hardware units fail and a Driving Control Error (DCE) wherein the autonomous vehicle fails to switch from an autonomous mode to a manual mode based on the vehicle failure information;

loading, by the road assistance system, a list of a plurality of sensing devices associated with the road assistance system;

sending, by the road assistance system, a selective multicast discovery request to each sensing device of the plurality of sensing devices;

receiving, by the road assistance system, a location coordinate and a diagnostic trouble code (DTC) of each sensing device of one or more sensing devices from the plurality of sensing device;

establishing, by the road assistance system, a network connection with the one or more sensing devices based on the location coordinate and the DTC;

obtaining, by the road assistance system, current surrounding environment information for the autonomous vehicle from one of, the autonomous vehicle and the one or more sensing devices located in proximity to the autonomous vehicle;

generating, by the road assistance system, at least one control instruction based on the type of failure being at least one of an EPE, DME and a DCE and the current surrounding environment information, wherein the at least one control instruction is generated by determining trajectory information for the autonomous vehicle, and wherein the trajectory information for the autonomous vehicle is determined by:
(a) calculating a relative position of the autonomous vehicle with respect to each of the one or more sensing devices:
(b) determining a relative distance of at least one obstacle from the autonomous vehicle;
(c) determining a distance between one of the one or more sensing devices and the autonomous vehicle based on the calculated relative position using a predefined technique;
(d) obtaining an image captured by the sensing device and determine a first distance between the autonomous vehicle and the sensing device and a second distance between the obstacle and the sensing device;
(e) matching the first distance and the second distance with relative distance to identify the autonomous vehicle;
(f) performing steps (a-e) for remaining of the one or more sensing devices located in proximity to the autonomous vehicle; and
(g) combining output from each of the one or more sensing devices to obtain the trajectory information of the autonomous vehicle; and providing, by the road assistance system, the at least one control instruction to the autonomous vehicle for execution during the emergency failure situation.

2. The method as claimed in claim 1, wherein establishing the network connection with the autonomous vehicle comprises:
authenticating, by the road assistance system, the autonomous vehicle based on the request for the network connection;
based on a result of the authentication, performing one of:
enabling a communication with the autonomous vehicle; or
initiating a new registration process for the autonomous vehicle for enabling the communication.

3. The method as claimed in claim 1, wherein the vehicle failure information comprises an error status message for one or more units of the autonomous vehicle, details of diagnostic error code set due to the failure of one or more corresponding hardware unit, location information, a speed and a direction related to movement information.

4. The method as claimed in claim 1, wherein the type of failure includes failure in at least one unit of the autonomous vehicle, system failure and driver assistance request.

5. The method as claimed in claim 4, wherein generating the control instruction for the EPE failure further comprises:
(a) obtaining location details of the autonomous vehicle using a vehicle location tracker;
(b) creating a predefined radius area centralized to the location of the autonomous vehicle;
(c) identifying one or more sensing devices in proximity to the radius area;
(d) obtaining surrounding environment information from each of the identified one or more sensing devices;
(e) identifying the trajectory information for the autonomous vehicle for autonomous control based on the obtained surrounding environment information;
(f) starting a timer based on speed of the autonomous vehicle; and
(g) recursively perform steps (a-e) until the autonomous vehicle reach destination location.

6. The method as claimed in claim 4, wherein generating the control instruction for the DME failure comprises:
obtaining surrounding environment information from the autonomous vehicle; and
determining the trajectory information for the autonomous vehicle for autonomous driving based on the obtained surrounding environment information.

7. The method as claimed in claim 4, wherein control instruction for the DCE failure comprises:
creating a predefined radius area centralized to location of the autonomous vehicle;
identifying one or more sensing devices in proximity to the radius area; and
calculating the trajectory information based on sensing data received from the one or more sensing devices to safely stop the autonomous vehicle.

8. The method as claimed in claim 1, wherein the at least one control instruction comprises Control command with Environment perception data (CCEPD) in case the request received from the autonomous vehicle is EPE and includes providing trajectory information to the autonomous vehicle, wherein the autonomous vehicle generates control instruction for autonomous driving on reception of the trajectory information, and Control command with Decision data (CCDD) upon the request from the autonomous vehicle being one of a DME or a DCE and includes generating and sending control instruction based on the trajectory information to the autonomous vehicle for autonomous driving.

9. A road assistance system for safe handling an autonomous vehicle during emergency failure situation, comprising:
a processor; and
a memory communicatively coupled to the processor, wherein the memory stores processor instructions, which, on execution, causes the processor to:
establish a network connection with an autonomous vehicle, wherein a request for the network connection is transmitted by the autonomous vehicle on detection of one or more operation failures;
upon establishing the network connection with the autonomous vehicle, receive vehicle failure information from the autonomous vehicle;
determine a type of failure to be at least one of an Environment Perception Error (EPE), wherein the autonomous vehicle is unable to perceive the surrounding environment, a Decision Making Error (DME), wherein one or more hardware units fails and a Driving Control Error (DCE) wherein the autonomous vehicle fails to switch from an autonomous mode to a manual mode based on the vehicle failure information;

load a list of a plurality of sensing devices associated with the road assistance system;

send a selective multicast discovery request to each sensing device of the plurality of sensing devices;

receive a location coordinate and a diagnostic trouble code (DTC) of each sensing device of one or more sensing devices from the plurality of sensing device;

establish a network connection with the one or more sensing devices based on the location coordinate and the DTC;

obtain current surrounding environment information for the autonomous vehicle from one of, the autonomous vehicle and the one or more sensing devices located in proximity to the autonomous vehicle;

generate at least one control instruction based on the type of failure being at least one of an EPE, DME and a DCE and the current surrounding environment information wherein the at least one control instruction is generated by determining trajectory information for the autonomous vehicle, and wherein the trajectory information for the autonomous vehicle is determined by:
  (a) calculating a relative position of the autonomous vehicle with respect to each of the one or more sensing devices;
  (b) determining a relative distance of at least one obstacle from the autonomous vehicle;
  (c) determining a distance between one of the one or more sensing devices and the autonomous vehicle based on the calculated relative position using a predefined technique;
  (d) obtaining an image captured by the sensing device and determine a first distance between the autonomous vehicle and the sensing device and a second distance between the obstacle and the sensing device;
  (e) matching the first distance and the second distance with relative distance to identify the autonomous vehicle;
  (f) performing steps (a-e) for remaining of the one or more sensing devices located in proximity to the autonomous vehicle; and
  (g) combining output from each of the one or more sensing devices to obtain the trajectory information of the autonomous vehicle; and
provide the at least one control instruction to the autonomous vehicle for execution during the emergency failure situation.

10. The road assistance system as claimed in claim 9, wherein the processor establishes the connection with the autonomous vehicle by:
authenticating the autonomous vehicle based on the request for the network connection; based on a result of the authentication, performing one of:
enabling a communication with the autonomous vehicle; or
initiating a new registration process for the autonomous vehicle for enabling the communication.

11. The road assistance system as claimed in claim 9, wherein the vehicle failure information comprises an error status message for one or more units of the autonomous vehicle, details of diagnostic error code set due to the failure of one or more corresponding hardware unit, location information, a speed and a direction to movement information.

12. The road assistance system as claimed in claim 9, wherein the type of failure includes failure in at least one unit of the autonomous vehicle, system failure and driver assistance request.

13. The road assistance system as claimed in claim 12, wherein the processor generates control instruction for the EPE failure by:
  (a) obtaining location details of the autonomous vehicle using a vehicle location tracker;
  (b) creating a predefined radius area centralized to the location of the autonomous vehicle;
  (c) identifying one or more sensing devices in proximity to the radius area;
  (d) obtaining surrounding environment information from each of the identified one or more sensing devices;
  (e) identifying the trajectory information for the vehicle for autonomous control based on the obtained surrounding environment information;
  (f) starting a timer based on speed of the autonomous vehicle; and
  (g) recursively perform steps (a-e) until the autonomous vehicle reach destination location.

14. The road assistance system as claimed in claim 12, wherein the processor generates control instruction for the DME failure by:
obtaining surrounding environment information from the autonomous vehicle; and
determining the trajectory information for the vehicle for autonomous driving based on the obtained surrounding environment information.

15. The road assistance system as claimed in claim 12, wherein the processor generates control instruction for the DCE failure by:
creating a predefined radius area centralized to location of the autonomous vehicle;
identifying one or more sensing devices in proximity to the radius area; and
calculating the trajectory information based on sensing data received from the one or more sensing devices to safely stop the autonomous vehicle.

16. The road assistance system as claimed in claim 9, wherein the at least one control instruction comprises Control command with Environment perception data (CCEPD) in case the request received from the autonomous vehicle is EPE and includes providing trajectory information to the autonomous vehicle, wherein the autonomous vehicle generates control instruction for autonomous driving on reception of the trajectory information, and Control command with Decision data (CCDD) upon the request from the autonomous vehicle being one of a DME or a DCE and includes generating and sending control instruction based on the trajectory information to the autonomous vehicle for autonomous driving.

17. A non-transitory computer readable medium including instruction stored thereon that when processed by at least one processor cause a road assistance system to perform operation comprising:
establishing a network connection with an autonomous vehicle, wherein a request for the network connection is transmitted by the autonomous vehicle on detection of one or more operation failures;
upon establishing the network connection with the autonomous vehicle, receiving vehicle failure information from the autonomous vehicle;

determining a type of failure in the autonomous vehicle based on the vehicle failure information to be at least one of an Environment Perception Error (EPE), wherein the autonomous vehicle is unable to perceive the surrounding environment, a Decision Making Error (DME), wherein one or more hardware units fail and a Driving Control Error (DCE) wherein the autonomous vehicle fails to switch from an autonomous mode to a manual mode;

loading a list of a plurality of sensing devices associated with the road assistance system;

sending a selective multicast discovery request to each sensing device of the plurality of sensing devices;

receiving a location coordinate and a diagnostic trouble code (DTC) of each sensing device of one or more sensing devices from the plurality of sensing device;

establishing a network connection with the one or more sensing devices based on the location coordinate and the DTC;

obtaining current surrounding environment information for the autonomous vehicle from one of, the autonomous vehicle and one or more sensing devices located in proximity to the autonomous vehicle;

generating at least one control instruction based on the type of failure being at least one of an EPE, DME and a DCE and the current surrounding environment information, wherein the at least one control instruction is generated by determining trajectory information for the autonomous vehicle, and wherein the trajectory information for the autonomous vehicle is determined by:

(a) calculating a relative position of the autonomous vehicle with respect to each of the one or more sensing devices;

(b) determining a relative distance of at least one obstacle from the autonomous vehicle;

(c) determining a distance between one of the one or more sensing devices and the autonomous vehicle based on the calculated relative position using a predefined technique;

(d) obtaining an image captured by the sensing device and determine a first distance between the autonomous vehicle and the sensing device and a second distance between the obstacle and the sensing device;

(e) matching the first distance and the second distance with relative distance to identify the autonomous vehicle;

(f) performing steps (a-e) for remaining of the one or more sensing devices located in proximity to the autonomous vehicle; and combining output from each of the one or more sensing devices to obtain the trajectory information of the autonomous vehicle; and providing the at least one control instruction to the autonomous vehicle for execution during the emergency failure situation.

* * * * *